US007823335B2

(12) United States Patent
Lin

(10) Patent No.: US 7,823,335 B2
(45) Date of Patent: Nov. 2, 2010

(54) WALL EDGE VORTEX SUPPRESSOR

(75) Inventor: Jason JianXiong Lin, Cary, NC (US)

(73) Assignee: Renscience IP Holdings Inc., Raleigh, NC (US)

( * ) Notice: Subject to any disclaimer, the term of this patent is extended or adjusted under 35 U.S.C. 154(b) by 0 days.

(21) Appl. No.: 11/286,855

(22) Filed: Nov. 26, 2005

(65) Prior Publication Data

US 2008/0005985 A1    Jan. 10, 2008

Related U.S. Application Data

(60) Provisional application No. 60/636,083, filed on Dec. 15, 2004.

(51) Int. Cl.
*E04D 3/38* (2006.01)
(52) U.S. Cl. .................. 52/58; 52/300; 52/60
(58) Field of Classification Search ............. 52/582.1, 52/58, 84, 24, 82, 94–97, 244, 245, 631, 52/287.1, 288.1, 57, 25, 173.1, 173.2; 454/365
See application file for complete search history.

(56) References Cited

U.S. PATENT DOCUMENTS

| | | | |
|---|---|---|---|
| 397,534 A | | 2/1889 | Carroll |
| 417,270 A | * | 12/1889 | Nelson ................... 52/57 |
| 1,316,968 A | | 9/1919 | Neill et al. |
| 2,021,929 A | * | 11/1935 | Voigt ...................... 52/277 |
| 2,123,967 A | | 7/1938 | Richter |
| 2,206,040 A | | 7/1940 | Ludington |
| 2,270,537 A | | 1/1942 | Ludington |
| 2,270,538 A | | 1/1942 | Ludington |
| 2,473,400 A | | 6/1949 | Waara |
| 2,968,128 A | | 1/1961 | Pelican |
| 3,012,376 A | | 12/1961 | Reddy et al. |
| 3,024,573 A | | 3/1962 | McKinley |
| 3,187,464 A | | 6/1965 | Sharp |
| 3,280,524 A | | 10/1966 | Hull |
| 3,717,968 A | * | 2/1973 | Olsen et al. ............. 52/288.1 |
| 3,742,668 A | * | 7/1973 | Oliver ..................... 52/288.1 |

(Continued)

FOREIGN PATENT DOCUMENTS

JP    5-133141    5/1993

(Continued)

OTHER PUBLICATIONS

MM Systems Corp. Snap-Lok Coping Systems (Bullnose Coping), Advertising Web Page, Nov. 6, 2000, http: www.colliersf.com/mmcoping.html .

(Continued)

*Primary Examiner*—Richard E Chilcot, Jr.
*Assistant Examiner*—Mark R Wendell
(74) *Attorney, Agent, or Firm*—Finnegan, Henderson, Farabow, Garrett & Dunner, LLP

(57) ABSTRACT

An apparatus disposed along and attached to a wall edge to mitigate wind-generated vortices and suction loads on the wall, suitable and convenient for both new constructions and retrofits of existing buildings. Preferred configurations are described and include such types as wall edge cap, wall edge windscreen and wall edge wind spoiler, each utilizing a distinctive primary aerodynamic mechanism, often with optional secondary mechanisms to enhance vortex-suppressing effects.

21 Claims, 3 Drawing Sheets

U.S. PATENT DOCUMENTS

| | | | |
|---|---|---|---|
| 4,005,557 | A | 2/1977 | Kramer et al. |
| 4,233,786 | A | 11/1980 | Hildreth |
| 4,461,129 | A | 7/1984 | von Platen |
| 4,549,376 | A | 10/1985 | Hickman |
| 4,598,507 | A | 7/1986 | Hickman |
| 4,665,667 | A | 5/1987 | Taylor et al. |
| 4,672,781 | A | 6/1987 | Pichon |
| 4,780,999 | A | 11/1988 | Webb et al. |
| 4,830,315 | A | 5/1989 | Presz et al. |
| 4,858,406 | A | 8/1989 | Lane et al. |
| 4,957,037 | A | 9/1990 | Tubbesing et al. |
| 5,016,404 | A | 5/1991 | Briggs |
| 5,031,367 | A | 7/1991 | Butzen |
| 5,050,489 | A * | 9/1991 | Mankowski ............. 454/365 |
| 5,189,853 | A | 3/1993 | Braine |
| 5,414,965 | A | 5/1995 | Kelley et al. |
| D361,138 | S | 8/1995 | Moore et al. |
| 5,813,179 | A * | 9/1998 | Koenig et al. ............. 52/255 |
| 5,918,423 | A | 7/1999 | Ponder |
| 6,044,601 | A * | 4/2000 | Chmela et al. .......... 52/287.1 |
| 6,128,865 | A | 10/2000 | Din |
| 6,212,829 | B1 | 4/2001 | Webb |
| 6,212,836 | B1 * | 4/2001 | Larson .................. 52/287.1 |
| 6,325,712 | B1 | 12/2001 | Lawless, III et al. |
| 6,360,504 | B1 * | 3/2002 | Webb et al. ............... 52/300 |
| 6,539,675 | B1 | 4/2003 | Gile |
| 6,601,348 | B2 | 8/2003 | Banks et al. |
| 6,606,828 | B1 | 8/2003 | Lin et al. |
| 6,786,015 | B2 | 9/2004 | Wilt |
| 6,786,018 | B2 | 9/2004 | Webb et al. |
| 7,137,224 | B2 | 11/2006 | Rasmussen et al. |
| 7,487,618 | B2 | 2/2009 | Lin |
| 2002/0083666 | A1 * | 7/2002 | Webb et al. ............... 52/300 |
| 2002/0124485 | A1 | 9/2002 | Pulte |
| 2003/0061771 | A1 | 4/2003 | Kintop |
| 2005/0210759 | A1 | 9/2005 | Austin et al. |
| 2006/0248810 | A1 | 11/2006 | Ewing |
| 2007/0113489 | A1 | 5/2007 | Kaiser et al. |

FOREIGN PATENT DOCUMENTS

| | | |
|---|---|---|
| JP | 6-307122 | 11/1994 |
| JP | 6-336860 | 12/1994 |
| JP | 7-158318 | 6/1995 |
| JP | 8-49448 | 2/1996 |
| JP | 8-218683 | 8/1996 |
| JP | 2000-8326 | 1/2000 |
| JP | 2003-206606 | 7/2003 |

OTHER PUBLICATIONS

MM Systems Corp., Fascia Systems (Vari-Fascia) Advertising Web Page, Nov. 6, 2000, http : www.colliersf.com/mmfascia.

Lin et al., Supressing Extreme Suction . . . , Conf. Proc. vol. I, The 7th U.S. National Conf. on Wind Engineering, Jun. 27, 1993, p. 413-422, UCLA, Los Angeles, USA.

Surry et al., The Effect of Surroundings and Roof Corner Geometric . . . , Journal of Wind Engineering & Industrial Aerodynamics, Apr. 27, 1995, p. 115-138, vol. 58, Elsevier, Amsterdam, The Netherlands.

Metal-Era, Roof Edge Systems, Catalog No. 79709000, 1997, p. 4, p. 8 & p. 9, Metal-Era, Inc., Waukesha ,WI, USA.

Overly Metal Coping, p. 4, Overly Manufacturing Company 1965, 4 pages.

MM Systems Architectural Roof Edge Technologies, 2001, 4 pages.

U.S. Appl. No. 11/236,394, filed Sep. 24, 2005, including Amendment, Drawings, Abstract, Claims, and Specification.

U.S. Appl. No. 11/098,330, filed Apr. 4, 2005, including Prel. Amendment, Drawings, Abstract, Claims, Specification, Examiner's search strategy and results, Search Information including classification, databases and other search related notes, Bibliographic Data Sheet, Non-Final Rejection, Amendment—After Non-Final Rejection.

U.S. Appl. No. 11/187,100, filed Sep. 23, 2005, including Prel Amendment, Drawings, Abstract, Claims, Specification, Prel Amendment, Requirement for Restriction/Election, and Response to Election/Restriction Filed.

International Search Report and Written Opinion of the International Searching Authority, International Application PCT/US07/20556 (filed Sep. 24, 2007) mailed Jul. 21, 2008 (9 pages).

Office Action mailed Dec. 10, 2008 in U.S. Appl. No. 11/236,394, filed Sep. 24, 2005 (7 pages).

Office Action mailed Dec. 8, 2008 in U.S. Appl. No. 11/187,100, filed Jul. 23, 2005 (17 pages).

Supplemental Notice of Allowability mailed Oct. 17, 2008 and Notice of Allowability mailed on Sep. 29, 2008 in U.S Appl. No. 11/098,330, filed Apr. 4, 2005 (12 pages).

U.S. Appl. No. 12/320,867, filed Feb. 6, 2009: specification and abstract (11 pages), drawings (4 pages), and Preliminary Amendment filed Feb. 6, 2009 (11 pages).

U.S. Appl. No. 11/187,100, filed Jul. 23, 2005: non-final Office Action dated May 13, 2008 (13 pages), Interview Sumary dated Jul. 29, 2008 (2 pages), Amendment filed Aug. 8, 2008 (22 pages), Response to Final Office Action filed May 8, 2009 (24 pages).

U.S. Appl. No. 11/236,394, filed Sep. 24, 2005: Office Action dated Sep. 8, 2008 (5 pages); Response filed Oct. 8, 2008 (10 pages); Amendment filed Apr. 10, 2009 (20 pages).

U.S. Appl. No. 12/320,867, filed Feb. 6, 2009: Office Action dated Nov. 11, 2009 (18 pgs).

U.S. Appl. No. 12/320,867, filed Feb. 6, 2009: Reply filed Apr. 12, 2010 (19 pages).

U.S. Appl. No. 11/187,100, filed Jul. 23, 2005: Final Office Action dated May 12, 2010 (14 pages), Response filed Jan. 20, 2010 (36 pages).

U.S. Appl. No. 11/098,330, Lin.

U.S. Appl. No. 11/187,100, Lin.

U.S. Appl. No. 11/236,394, Lin.

* cited by examiner

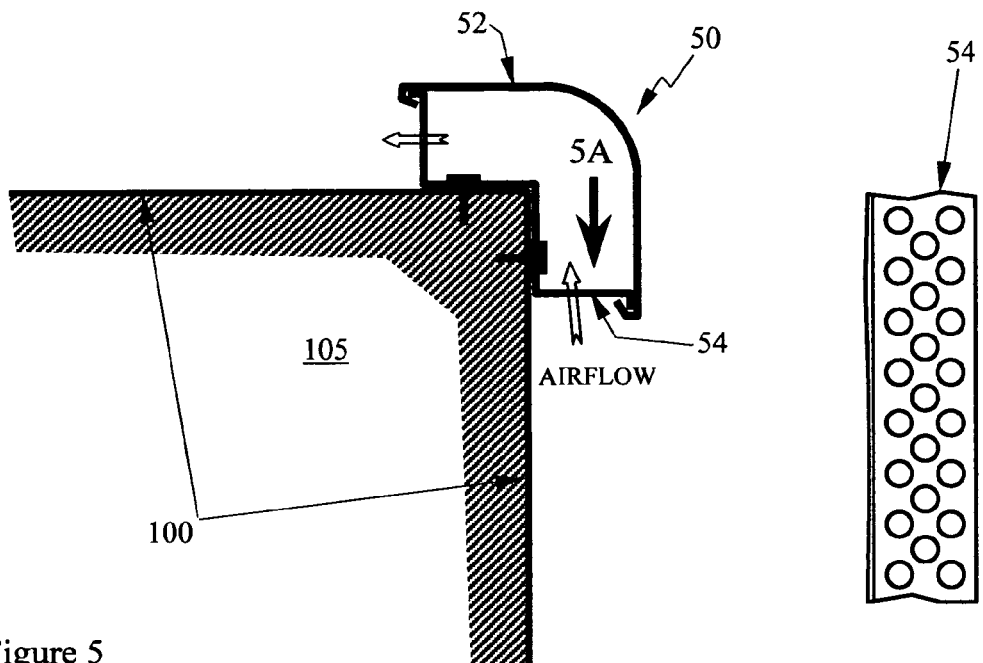
Figure 5
Figure 5A
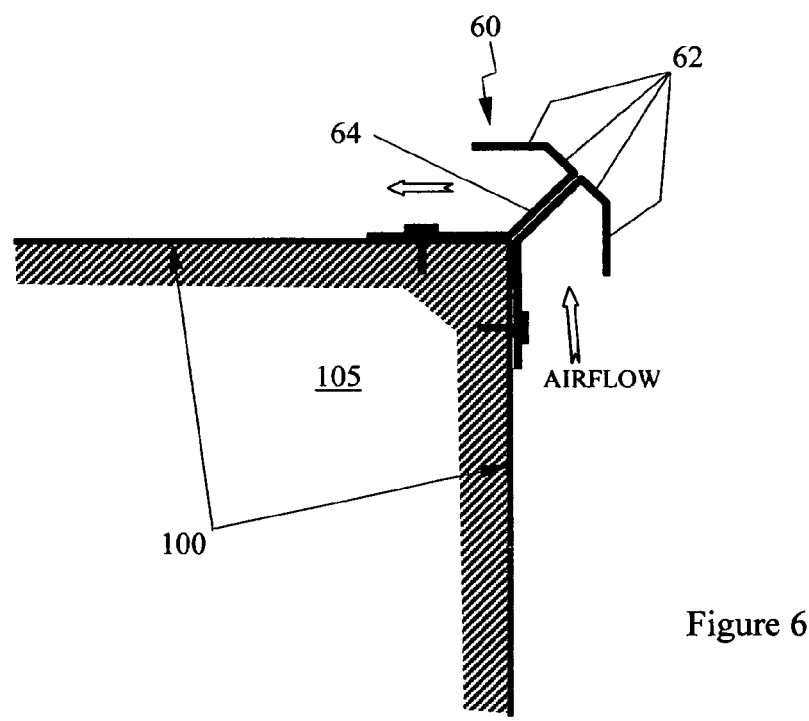
Figure 6

WALL EDGE VORTEX SUPPRESSOR

CROSS-REFERENCE TO RELATED APPLICATIONS

This application is entitled to the benefit of Provisional Patent Application Ser. No. 60/636,083, filed Dec. 15, 2004.

SEQUENCE LISTING

Non-Applicable.

BACKGROUND

1. Field of Invention

This invention relates to an aerodynamic means that mitigate wind generated vortices and wind loads in the wall edge areas of a building, in a simple, effective, and economical way, applicable for both new constructions and retrofits of existing buildings.

2. Discussion of Prior Art

Conventional wall construction practices normally result in a wall edge configuration that tends to generate strong edge vortex and subjects the wall edge area to severe outward suction loads and high risk of wind induced damage. Traditionally, structural strengthening methods have been relied upon, to counter this severe suction force and mitigate damage risk. The wall edge vortex suppressor disclosed herein functions to reduce the suction force and thus mitigates wind damage risk, through passive flow control techniques that eliminate or suppress the wall edge vortex, which is the prime cause for the high suction force.

SUMMARY OF THE INVENTION

This invention discloses an aerodynamic means that mitigate strong vortices and high loads induced by wind on the wall edge area of a building, in a simple, effective, and economical way, applicable and convenient for both new constructions and retrofits of existing buildings. This is achieved by using elongated devices of appropriate configurations mounted along a wall edge, therefore to intervene with the wind flow and suppress edge vortex. Examples of such configurations include wall edge cap, windscreen and wind spoiler. These devices primarily comprise of elongated members mounted to a wall edge and defining a new exterior configuration of a building corner, and appropriate means to attach and secure the elongated member to a building corner.

Herein wall edge refers to an edge at which two terminating wall surfaces intersect at an approximately right angle and form a convex corner of a building. Vortex formation and extreme wind load are inherent around a building corner, where abrupt change in wall surface orientation occurs along the flow path such that the accelerated wind flow around a corner severely separates from the downstream wall surface. A wall edge vortex suppressor intervenes and modifies the wind flow around the corner of a building. It mitigates flow separation, prevents vortex formation or suppresses its strength, and ultimately reduces the wind force exerted on the wall area adjacent to the edge where most initial wind damages to a wall system occur.

OBJECTS AND ADVANTAGES

Several objects and advantages of the present invention are:

to provide wall edge devices which suppress edge vortex formation and reduce wind loads on wall cladding in a building corner area;

to provide wall edge devices which reduce wind loads generally on a wall system that are transferred from the wall cladding;

to provide wall edge devices which stabilize wind flow around wall corners and minimize cyclic loads on wall components resulting from recurring winds, reducing the chances of damage due to material fatigue;

to provide wall edge devices which possess the desired aerodynamic performance for a more wind resistant building structure while maintaining aesthetic and waterproofing functionality under both extreme and recurring weather conditions.

Further objects or advantages are to provide wall edge devices which protect a wall system from wind and rain damage, and which are still among the simplest, most effective and reliable, and inexpensive to manufacture and convenient to install. These and still further objects and advantages will become apparent from a consideration of the ensuing description and drawings.

BRIEF DESCRIPTION OF THE DRAWINGS

FIG. 5 schematically shows a cross-sectional view for one of the preferred embodiments of wall edge wind spoiler. FIG. 5A is view 5A from FIG. 5, exemplifying an longitudinally continuous support with face perforation for a wind spoiler.

FIG. 6 illustrates an alternative configuration of wall edge wind spoilers.

DESCRIPTION OF THE PREFERRED EMBODIMENTS

Figure 1:
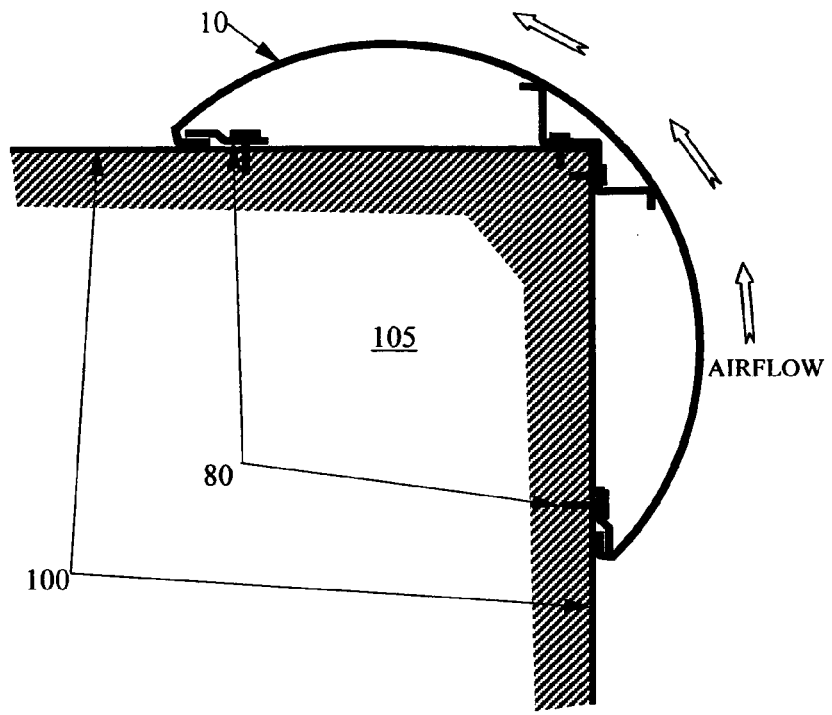
FIG. 1 schematically shows a cross-sectional view for one of the preferred embodiments of wall edge cap, being mounted to both sides of a wall edge.

FIG. 1 illustrates a preferred configuration of wall edge cap 10, in a cross-sectional top view. The wall edge cap's arch shape, or any other similar shape of gradual slope change or modest curvature, eliminates or reduces the abrupt change in surface orientation along the flow path around a building corner 105 where two exterior wall surfaces 100 intersect. This will mitigate edge vortex formation and result in the reduction of aerodynamic forces, primarily the outward suction force, exerted on the downwind wall areas adjacent to the edge. Multiple straight segments can also be used to approximate an arched exterior shape for a wall edge cap. The exterior surfaces of the wall edge cap can be optionally perforated to enhance the device's vortex-suppressing effects, as described for edge screens later in this application.

Any appropriate means to attach and secure the devices to wall surfaces are allowable if it does not significantly affect or alter the exterior shape of the device in a way that detriments the vortex-suppressing function. For example, a set of cleats and fasteners 80 as illustrated in FIG. 1 can be used for securing the apparatus.

Figure 2:
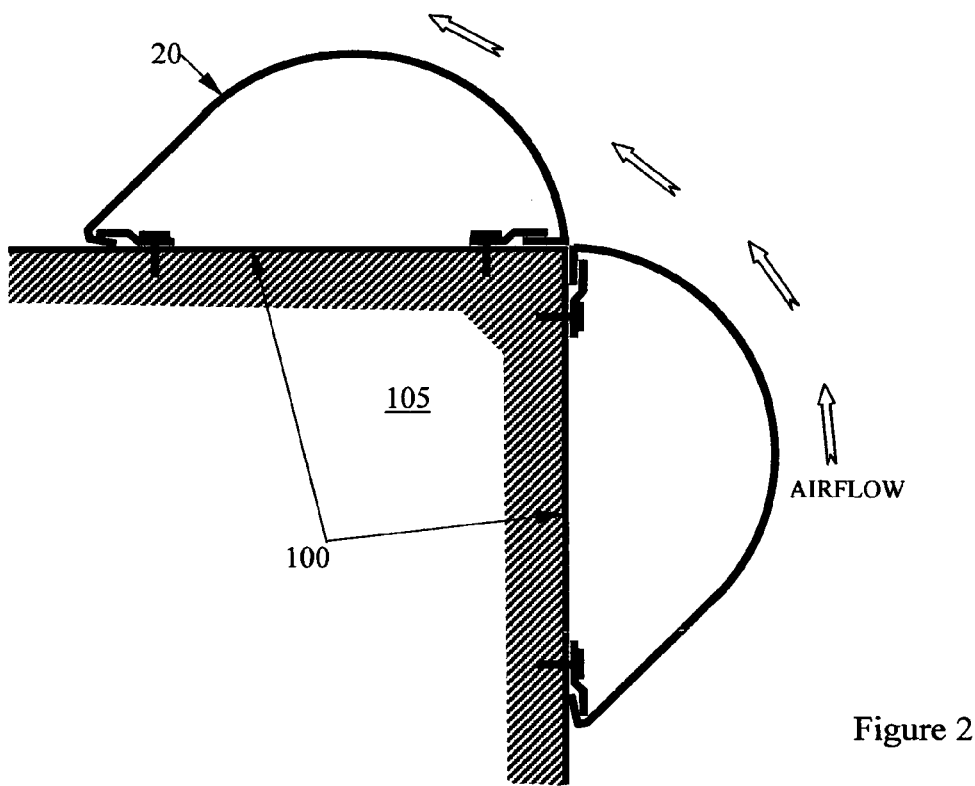
FIG. 2 illustrates an alternative configuration of wall edge caps, being mounted to each side of a wall edge separately.

FIG. 2 shows an alternative configuration of a wall edge cap assembly 20 that functions in a similar fashion as that illustrated in FIG. 1. Multiple straight segments can also be used to approximate the curved exterior shape.

Figure 3:
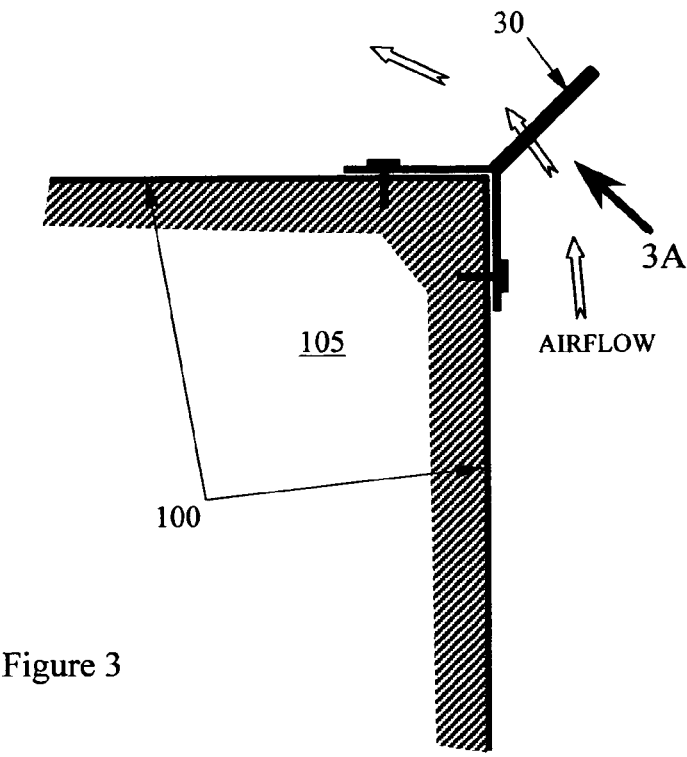
FIG. 3 schematically shows a cross-sectional view for one of the preferred embodiments of wall edge windscreen.
Figure 3A:
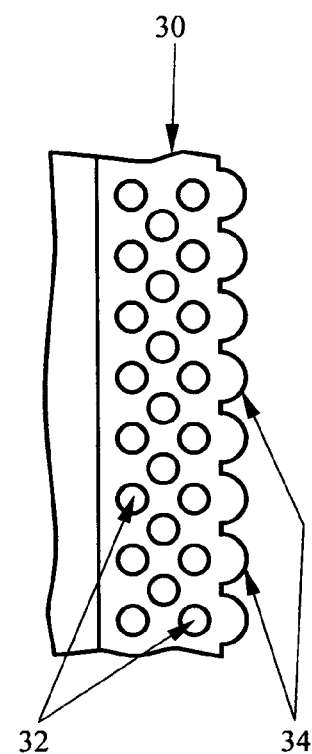
FIG. 3A is view 3A from FIG. 3, exemplifying face perforation and edge serration of a windscreen.

FIG. 3 illustrates a preferred configuration of wall edge screen 30 in a cross-sectional top view. The perforated face protrudes outwardly from the wall corner 105, preferably along the axis of symmetry. The wall edge screen employs a venting mechanism to suppress the vortex formation and vortex induced suction force. The perforated face of a wall edge screen generally reduces the flow acceleration around the corner. At the same time it facilitates pressure equalization across the screen face and around the wall corner 105 through a "bleeding" or venting effect, which prevents vortex formation around and behind the outer edge of the windscreen. It also breaks the flow around the corner down to small, random and unorganized eddies, and leads to dissipation of kinetic energy. Optional outer edge serration of the windscreen provides similar effects of flow breakdown and kinetic energy dissipation. View 3A form FIG. 3 is shown in FIG. 3A to illustrate an example for face perforation and edge serration of a wall edge windscreen.

Figure 4:
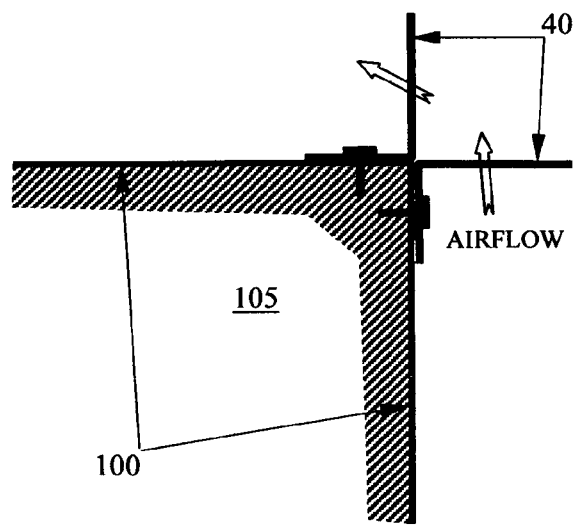
FIG. 4 exemplifies alternative configuration of wall edge windscreens.

FIG. 4 shows an alternative configuration of a wall edge windscreen assembly 40. The perforated faces form an approximately symmetrical arrangement, each forming an angle to a wall 100. Although, the perforated face shown here forms a right angle to a wall surface, the acceptable angles range from the limit case as in FIG. 3 (aligning with axis of symmetry) to that of about 45° with respect to the wall on the same side.

FIG. 5 illustrates a preferred configuration of wall edge wind spoiler 50, again in a cross-sectional top view. The wind spoiler uses yet another mechanism to mitigate vortex formation around a wall corner 105 of a building. The raised and bent spoiler plate 52 forces the wind flow around the wall corner to conform approximately to the exterior wall surfaces, and thus suppresses flow separation and vortex formation. The resulting effect is the reduction of the wind suction force on the wall area downwind of the wall corner 105. A plurality of methods is suitable for supporting the raised spoiler plate to the wall corner, as long as the support members do not collectively obstruct the airflow path between the raised spoiler plate and the wall corner. A preferred option is to use significantly perforated, longitudinally continuous, plate-like supports 54 as exemplified in FIG. 5A, which provide additional effects of flow breakdown and kinetic energy dissipation as described above for edge windscreens.

FIG. 6 shows an alternative configuration to form an edge wind spoiler assembly 60. The raised and bent plates 62 can be configured with multiple straight segments as shown herein or with curved ones. The end segment of the raised plate shall preferably be approximately in parallel with one of the walls 100 secured thereto. The perforated double plates 64 serve as supports to the raised plate segments and as a corner wind screen.

The devices can be made of any durable materials that provide mechanical strength and stiffness sufficient to sustain high winds and other weather elements over time. These include, but are not limited to, sheet metal, acrylic, and for the edge cap treated solid wood, etc. Extrusion, or cold form where applicable or other appropriate methods, can be used to manufacture the devices. A generally symmetric shape is preferred for a wall edge vortex-suppressing device in that wind can come from either side of a building corner. However, deviation from a symmetric configuration is allowable for any practical purposes as far as the alteration does not deviate from the spirit of this disclosure for wall edge vortex-suppressing devices.

INSTALLATION AND OPERATION

Any appropriate means to attach and secure the devices to wall surfaces are allowable if it does not significantly affect or alter the exterior shape of the device in a way that detriments the vortex-suppressing function. For example, a set of cleats and fasteners can be used for securing the apparatus to the wall, as illustrated in the above figures.

An embodiment of this invention is a passive flow control device for wall edges. Once configured and installed properly, it stays functioning in such a way that it mitigates vortex formation around a wall edge and reduces wind loads on the wall, whenever the wind blows towards a building bearing such wall edge devices, and requires no active operational intervention.

CONCLUSION, RAMIFICATIONS, AND SCOPE

It is apparent that wall edge vortex suppressors of this invention provide advantageous devices for mitigating wall edge vortex and wall suction, and are still among the simplest, most effective and reliable, inexpensive to manufacture and convenient to install, with little, if any, maintenance required.

The present invention provides a simple and unique method for improving building wind resistance, not only suitable for new constructions but also for retrofit on existing buildings.

Although the description above contains many specifications, these should not be construed as limiting the scope of the invention but as merely providing illustrations of some of the presently preferred embodiments of this invention. Various changes, modifications, variations can be made therein without departing from the spirit of the invention. Wall edge vortex suppressors can be made of any reasonably durable material with any appropriate means of fabrication as long as a configuration according to the spirit of this invention is accomplished to support the described working mechanism and to provide the associated functionality. Any appropriate conventional or new mounting method can be used to secure a wall edge vortex suppressor to a building corner without departing from the spirit of this invention. Thus the scope of the invention should be determined by the appended claims and their legal equivalents, rather than by the examples given.

I claim:

1. An elongated apparatus disposed longitudinally along first and second substantially planar and substantially vertical exterior wall surfaces extending to an outside corner of a building, the corner extending in a substantially vertical direction, comprising:

a generally arch-shaped cap member including a first end portion and a second end portion, the generally arch-shaped cap member having a curved or incrementally bent exterior surface, wherein the first end portion of the generally arch-shaped member is mounted to the first substantially planar and substantially vertical exterior wall surface, wherein the second end portion of the generally arch-shaped member is mounted to the second substantially planar and substantially vertical exterior wall surface, wherein the exterior surface of the generally arch-shaped cap member defines a gradual slope change or modest curvature which eliminates or reduces an abrupt change in surface orientation along a flow path around the outside corner of the building, wherein the apparatus is mounted to an exterior of the building and exposed to wind, and wherein the generally arch-shaped cap member is substantially symmetrically arranged about a plane that bisects the outside corner of the building.

2. The elongated apparatus of claim 1, wherein the generally arch-shaped cap member includes a plurality of perforations.

3. The elongated apparatus of claim 1, further comprising at least one support bracket extending from at least one of the first and second substantially planar exterior wall surfaces to an interior surface of the generally arch-shaped cap member.

4. The elongated apparatus of claim 1, wherein the exterior surface of the generally arch-shaped cap member defines a substantially constant radius of curvature along a length thereof.

5. The elongated apparatus of claim 1, wherein at least one of the first end portion and the second end portion includes a part bent inward and positioned in-between an interior surface of the cap member and one of the exterior wall surfaces.

6. An elongated apparatus disposed longitudinally along first and second substantially planar and substantially vertical exterior wall surfaces extending to an outside corner of a building, the corner extending in a substantially vertical direction, comprising:

a curved or incrementally bent exterior surface;

a first end portion mounted to the first substantially planar and substantially vertical exterior wall surface; and a second end portion mounted to the second substantially planar and substantially vertical exterior wall surface, wherein the exterior surface defines a gradual slope change or modest curvature which eliminates or reduces an abrupt change in surface orientation along a flow path around the outside corner of the building, wherein the elongated apparatus is configured to suppress wind-generated vortex formation and to reduce wind-generated suction force adjacent to the outside corner of the building, wherein the apparatus is mounted to an exterior of the building and exposed to wind, and wherein the apparatus is substantially symmetrically arranged about a plane that bisects the outside corner of the building.

7. The elongated apparatus of claim 6, wherein the exterior surface is defined by at least one generally arch-shaped cap member including a plurality of perforations.

8. The elongated apparatus of claim 6, wherein the exterior surface is defined by at least one generally arch-shaped cap member, and wherein the assembly further comprises at least one support bracket extending from at least one of the first and second substantially planar exterior wall surfaces to an interior surface of the generally arch-shaped cap member.

9. The elongated apparatus of claim 6, wherein the exterior surface is defined by a generally arch-shaped cap member, and wherein the generally arch-shaped cap member is substantially symmetrically arranged about the plane that bisects the outside corner of the building.

10. The elongated apparatus of claim 6, wherein the exterior surface is defined by a generally arch-shaped cap member, and wherein the exterior surface of the generally arch-shaped cap member defines a substantially constant radius of curvature along a length thereof.

11. The elongated apparatus of claim 6, wherein the apparatus further comprises a first generally arch-shaped cap member having a first substantially convex exterior surface and being mounted to the first substantially planar and substantially vertical exterior wall surface with the first substantially convex exterior surface facing away from the first substantially planar and substantially vertical exterior wall surface; and a second generally arch-shaped cap member having a second substantially convex exterior surface and being mounted to the second substantially planar and substantially vertical exterior wall surface with the second substantially convex exterior surface facing away from the second substantially planar and substantially vertical exterior wall surface.

12. The elongated apparatus of claim 11, wherein the first generally arch-shaped cap member is mounted to the first exterior wall surface such that an end thereof is arranged along the outside corner of the building.

13. The elongated apparatus of claim 12, wherein the second generally arch-shaped cap member is mounted to the second exterior wall surface such that an end thereof is arranged along the outside corner of the building.

14. The elongated apparatus of claim 11, wherein the first and second generally arch-shaped cap members are shaped to be substantially symmetrical about the outside corner of the building.

15. The elongated apparatus of claim 11, wherein a portion of at least one of the first and second exterior surfaces is substantially planar.

16. The elongated apparatus of claim 11, wherein the first generally arch-shaped cap member has two opposite ends mounted to the first substantially planar and substantially vertical exterior wall surface, and wherein the second generally arch-shaped cap member has two opposite ends mounted to the second substantially planar and substantially vertical exterior wall surface.

17. The elongated apparatus of claim 11, wherein the first generally arch-shaped cap member comprises the first end portion, and the second generally arch-shaped cap member comprises the second end portion.

18. The elongated apparatus of claim 5, further comprising a cleat fastened to one of the exterior wall surfaces, the cleat engaging said part.

19. The elongated apparatus of claim 18, further comprising a fastener fastening the cleat to the building.

20. The elongated apparatus of claim 6, wherein a length of the apparatus extends in a substantially vertical direction.

21. The elongated apparatus of claim 6, wherein the apparatus comprises a generally arch-shaped cap member having the curved or incrementally bent surface, wherein the generally arch-shaped cap member covers the outside corner of the building, and wherein the curved or incrementally bent surface faces away from the outside corner of the building.

* * * * *